Patented Aug. 27, 1940

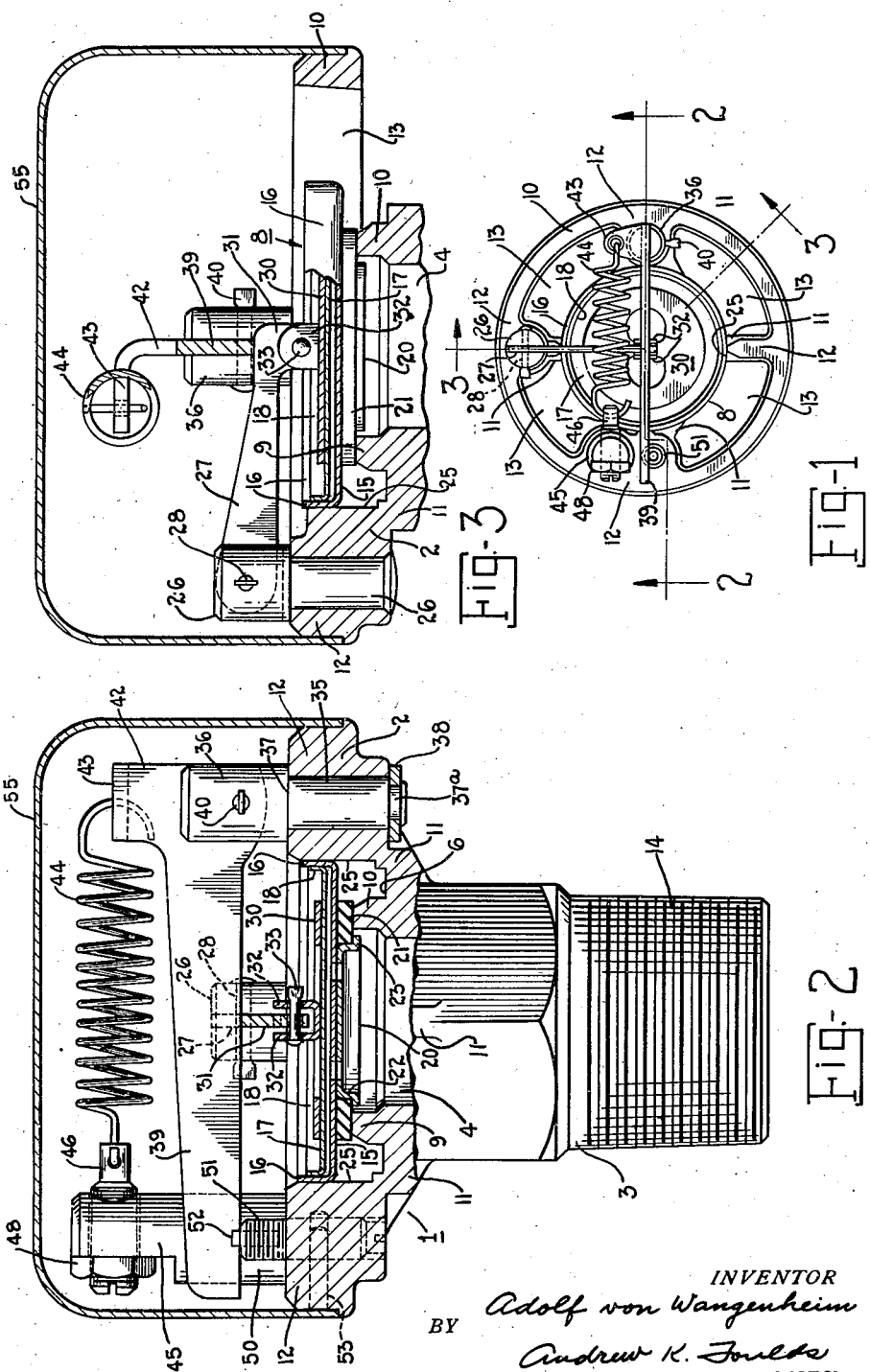

2,213,181

UNITED STATES PATENT OFFICE 2,213,181

PRESSURE RELIEF DEVICE

Adolf von Wangenheim, Detroit, Mich., assignor to Detroit Lubricator Company, Detroit, Mich., a corporation of Michigan Application May 8, 1936, Serial No. 78,634

15 Claims. (Cl. 137—53)

My invention relates generally to systems having fluid under pressure and more particularly to pressure relief devices therefor.

One of the objects of my invention is to provide a pressure relief device having new and improved operating mechanism.

Another object of my invention is to provide a new and improved pressure relief device of a character such that it can be readily and easily reset.

Another object of my invention is to provide a pressure relief device which will not leak when the pressure approaches the relieving point.

Another object of my invention is to provide a pressure relief device having a new and improved arrangement of the operating parts thereof.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a top plan view of my pressure relief device with the cover removed to show the operating parts thereof;

Fig. 2 is an enlarged view taken substantially along the line 2—2 of Fig. 1 and shown partly in cross section and partly in elevation, and Fig. 3 is an enlarged view taken substantially along the line 3—3 of Fig. 1 and shown partly in cross section and partly in elevation.

Referring to the drawing by characters of reference, the numeral 1 designates in general a supporting member or body which is preferably a casting having a base portion 2 on which is mounted the operating and associated parts of my pressure relief device. The body 1 includes a tubular shaped boss 3 cast integral with the base 2, the boss 3 being disposed centrally of the base and extending from one side thereof or downwardly, as seen in Fig. 2. The body 1 has an opening, or passage therethrough in the form of a bore 4 which extends longitudinally through the boss 3 and through the base 2 for the passage or escape of fluid when the device operates to relieve pressure. The bore 4 opens through the top wall, indicated at 6, of the base 2, providing a valve port which is normally closed by a loosely disposed valve member, designated in general by the numeral 8. Preferably the top wall 6 of the base 2 has an extended annular portion 9 surrounding the valve port to provide an upwardly facing seat for the valve-member 8. The base 2 includes an upwardly extending, annular or ring-like flange 10 which is circular in shape, in the present instance, and is joined to the base proper by substantially equally spaced ribs 11. The ribs 11, of which there are four in the present instance, each have an upwardly extending boss 12 at their outer ends, the bosses joining the inner wall of the annular flange 10 and terminating at their upper ends substantially flush with the upper edge of the annular flange 10. Through the openings, as at 13, between the spaced ribs 11, fluid flows externally of the device when the device acts to relieve fluid pressure. A lower end portion 14 of the tubular boss 3 may be externally threaded for connection in a fluid containing system (not shown) in which the pressure is to be relieved at a predetermined desired pressure.

The valve member 8 includes a movable wall or diaphragm 15 which has a larger area than the area of the valve port, the diaphragm 15 preferably being a pan-shaped member having an upwardly extending annular flange 16 defining its outer periphery. Telescoped or fitted within the pan-shaped diaphragm 15 there is a second diaphragm member 17 which also is preferably pan-shaped, having an upwardly extending annular flange whose outer surface abuts the inner surface of the annular flange 16 of the diaphragm 15. The diaphragms 15 and 17 are disposed with their diaphragms proper in spaced relation, and are secured together with the space between their flanges hermetically sealed, such as by solder. Welded or otherwise suitably secured to the underside of the pan-shaped diaphragm 15, centrally thereof, there is a clip member or holding means in the form of a plate 20 for holding a valve face member 21 to the underside of the pan-shaped member 15. The clip member 20 and diaphragm 15 are provided with aligning apertures therethrough for the passage of fluid under pressure into the space between the diaphragms 15 and 17. Flluid pressure thus acts on the diaphragms as well as on the relatively small portion of the valve member 8 overlying the valve port. The member 20 is formed having a down-turned annular flange 22 having an outturned annular flange portion 23, the valve face member 21 being held between the upper face of the flange portion 23 and the underside of the pan-shaped member 15. The valve face member 21 is a flat, ring-like member having a central aperture for receiving the downturned flange portion 22 of the plate member 20, the valve face member being constructed of a resilient material, such as rubber. In the inert form of the rubber valve face member 21, the diameter of its aperture is smaller than the diameter of the annular flange portion 23, but by slightly stretching the valve face member it can be passed over the flange 23 and thus the valve face member can be readily and easily attached or detached in the event that its replacement becomes necessary. The bosses 12 have inwardly disposed faces 25 which are shaped to conform to the outer contour of the flange 16 of the pan-shaped diaphragm 15 which slidably engages the inwardly disposed faces of the bosses 12. The inwardly disposed faces of the bosses 12 thus serve to guide the valve member 8 and to insure proper location of the valve member relative to its seat.

Rigidly secured in one of the bosses 12 of the base 2 there is a post 26 which has an upper end portion extending above the upper end of the boss 12. The upper end of the post 26 is bifurcated to receive one end of a lever member 27, the post and lever member being provided with aligning apertures to receive a pin 28. Pivotally connected to the other, or free end of the lever member 27 there is a backing plate 30 which normally lies flat against the upper surface of the inner pan-shaped diaphragm 17. In the present instance, the free end of the lever member 27 has a downwardly extending portion 31 which is positioned between two spaced, upturned ears 32 formed out of the backing plate 30, the ears and lever portion 31 having aligned apertures to receive a pin 33 for pivotally connecting the lever and backing plate together.

In another of the bosses 12 of base 2 there is provided a vertically extending bore therethrough for receiving a post 35 that has an enlarged upper end portion 36 which extends upwardly from the top of the boss, the enlarged portion providing a downwardly facing external shoulder 37 for seating on the upper face of the boss. The post 35 is rotatable relative to the base 2 and has a lower end portion 37ª extending below the underside of the base, the portion 37ª being provided with an annular slot or groove for loosely receiving a washer 38 to prevent undue longitudinal movement of the post. The upper end of the post 35 is bifurcated to receive one end of a lever member 39 which is pivoted thereto. The lever member 39 and post 35 may be provided with aligning apertures to receive a pin 40. The lever member 39 is thus mounted for pivotal movement about the pin 40 in the direction of movement of the valve member 8, and is also mounted for swivelling movement with the end portion 36 about the axis of the rotatable post 35 in a direction lateral to the direction of movement of the valve member 8. Normally the lever member 39 is disposed at substantially right angles, or transverse to the lever member 27 and extends centrally over the valve member 8, the free end of lever 39 extending over and above the boss 12 that is opposite the rotatable post 35. In its normal position the lever member 39 rests or bears on the free end of the lever 27 adjacent the end thereof, the lever 39 engaging the lever 27 at a point substantially midway between the ends of lever 39.

At its pivoted end the lever 39 has an upwardly extending portion 42 having a laterally extending lever arm 43 to which one end of a coil spring 44 is attached. The coil spring 44 extends longitudinally of the lever 39 and has its other end anchored to a post 45. The post 45 is rigidly secured to the base 2 in the boss 12 which is opposite the rotatable post 35, the post 45 extending upward from the upper end of the boss 12. Adjacent its upper end the post 45 is provided with a transversely extending aperture or bore for loosely receiving a threaded pin 46. Opposite end portions of the pin 46 project either side of the post 45, and to one end, or inner end of the pin 46, the other end of the coil spring 44 is attached. Threaded on the other or outer end of the pin 46, for abutment against a flat surface on the post 45, there is a nut 46 by means of which the tension on the spring 44 may be varied.

The coil spring 44 exerts a force tending to pivot the lever 39 in a counterclockwise direction, as seen in Fig. 2, and thus opposes the force exerted by the fluid pressure on the underside of the valve member 8 tending to move the valve member away from its seat. Also, the coil spring 44 tends to swivel the lever member 39 in a counterclockwise direction, as seen in Fig. 1. Secured in the boss 12 opposite the rotatable post 35, and adjacent the fixed post 45, there is a stop means 50 for preventing swivel movement of the lever 39 at pressures below a predetermined pressure acting on valve member 8. In the boss 12 there is provided a vertically extending threaded aperture for receiving a screw 51 whose upper end projects above the upper end or face of the boss 12. In the upper end of the screw 51 there is provided a longitudinally extending bored recess in which is rigidly secured a pin or latch member 52 which has an upper end portion projecting above the upper end of the screw 51. When the device is set for operation, the free end of the lever 39 is disposed between the latch or stop member 52 and the post 45, the coil spring 44 holding the free end of the lever 39 down against the upper end of screw 51 and also against the side of the latch pin member 52. If desired, there may be provided a laterally extending bore in the boss 12, and an aligning bore in the screw 51 for receiving a pin 53 to prevent rotation of the screw 51 after the position of the stop means has been established.

A cover or cap 55 may be provided for enclosing the operating and associated parts of my pressure relief device. In the present instance, the cover 55 telescopes or fits over the ring-like portion 10 of the base 2, the ring-like portion having an external, upwardly extending, annular shoulder against which the lower edge of the cover seats.

The operation of my pressure relief device is as follows: The pressure at which my device will operate to open the port to relieve pressure depends upon the force exerted by the spring 44 tending to hold the valve member 8 on its seat. For the purpose of exposition, assume that the force exerted by the spring 44 tending to hold the valve member on its seat is, say, a force of 10 pounds. Also assume that the effective area of the valve member, that is, the area against which the pressure acts through the valve port, is 1 square inch and that the areas of the diaphragms are 2 square inches. Now it will be seen that if there is a pressure acting against the underside of the valve member of, say, 5 pounds per square inch, there will be a pressure acting against the opposite inner sides of the diaphragms 15 and 17, of 5 pounds per square inch or a force of 10 pounds. Since it was assumed that the force exerted by the spring 44 was 10 pounds, it will be seen that this force and the opposing force of the fluid on the diaphragms are in balance. Since the force exerted by the fluid pressure against the upper face of the diaphragms is 10 pounds, and the force exerted against the underside of the valve member is 5 pounds, it will be apparent that the valve member will be held on its seat by a force of 5 pounds. When the pressure increases slightly so that the force acting against the underside of the diaphragm 17 exceeds the force of the spring 44, the diaphragm 17 will be flexed upwardly raising lever 39; but the valve face member 21 will remain on its seat 9 until after the free end of the lever 39 is raised above the upper end of the stop latch 52. When the lever 39 is raised above its latch it will be swivelled by the spring 44 in a counter-clockwise direction, as seen in Fig. 1. At a certain point during its swivel movement the lever 39 disengages from the lever 27, thus removing entirely the force opposing opening movement of the valve member 8. The loosely disposed valve member 8 is then moved upwardly by the fluid pressure, opening the port to full capacity for relieving pressure. To reset the device it is only necessary to position the valve member 8 on its seat, with the pivoted backing plate 30 resting on the valve member, and position the lever 39 on the latch 27 with the free end of the lever 39 latched back of the latch or stop pin 52.

From the foregoing description it will be seen that I have provided a pressure relief device having new and improved operating mechanism. Also, it will be seen that I have provided a pressure relief device in which the valve member is so constructed that it will not be moved away from its seat until the pressure at which the valve is to open is reached, thereby preventing leaking through the valve port at pressures approximating the relieving pressure. Furthermore, it will be seen that I have provided a new and improved valve structure in which the seating member, or disc, can be readily attached or detached therefrom.

What I claim and desire to secure by Letters Patent of the United States is:

1. A pressure relief device comprising a supporting member having an opening therein, a movable valve member for normally closing said opening and against which fluid under pressure acts, a lever member cooperable with said valve member and through which a force is exerted on said valve member to hold said valve member in closed position at pressures below a predetermined pressure, said lever member being fulcrumed for pivotal movement in the direction of movement of said valve member and also being supported to swivel laterally thereto to release said valve member, a coil spring disposed with its longitudinal axis extending longitudinally of said lever member and having one end fixed relative to said lever member and having its other end attached to said lever member, said spring normally acting to hold said valve member in closed position through said lever member and also acting to swivel said lever member laterally so that said valve member can be moved to relieve pressure through said opening, and stop means cooperable with said lever member to prevent lateral movement thereof at pressures below said predetermined pressure.

2. A pressure relief device comprising a supporting member having a valve port for the escape of fluid, a movable valve member cooperable with said port to control flow therethrough and against which the pressure acts, a lever member supported on said supporting member and normally engaging said valve member, said lever member overlying said valve member and fulcrumed to pivot in the direction of movement of said valve member, said lever member also being rotatable laterally to the direction of movement of said valve member to disengage therefrom so that said valve member can move to open said port, stop means acting to prevent lateral movement of said lever member at pressures below a predetermined pressure, and a coil spring positioned with its longitudinal axis extending longitudinally of said lever member with one end of said spring fixed relative to said lever member and the other end attached thereto, said spring exerting a force acting through said lever member to hold said valve member in closed position and also exerting a force acting to move said lever member laterally.

3. A pressure relief device comprising a supporting member having a valve port therein for flow of fluid to relieve pressure, a movable valve member for normally closing said port and against which fluid pressure acts, a lever member fulcrumed on said supporting member and having an end portion normally and loosely engaging said valve member, a second lever member fulcrumed on said supporting member and normally engaging said first-named lever member, said first-named lever member and said second-named lever member being fulcrumed for pivotal movement in the direction of movement of said valve member, said second-named lever member also being movable laterally to the direction of movement of said valve member to disengage from said first-named lever member so that said valve member can move to open said port, yieldable means exerting a force acting through said lever members to hold said valve member in closed position and also acting to move said second-named lever member laterally, and stop means for preventing lateral movement of said second-named lever member at pressures below a predetermined pressure.

4. A pressure relief device comprising a supporting member having a valve port for flow of fluid to relieve pressure and having wall means providing guide means, a loosely disposed valve member having a pressure sensitive chamber with a movable wall portion, means for transmitting the fluid pressure to said chamber, said valve member normally closing said port and being operable upon increasing pressures in said chamber below a predetermined pressure to hold said port closed with increasing force, said valve member being slidably guided by said wall means, a lever member fulcrumed on said supporting member and operatively connected to said valve member wall portion, said lever member acting as a force transmitting means through which said valve member is held in closed position at pressures below a predetermined pressure, said lever member being fulcrumed for pivotal movement in the direction of movement of said valve member and also being supported to swivel laterally to the direction of movement of said valve member to disconnect from said valve member so that said valve member can move to open position, spring means acting through said lever member and normally holding said valve member in closed position and also acting to swivel said lever member laterally, and stop means for preventing lateral movement of said lever member at pressures below said predetermined pressure.

5. A pressure relief device comprising a supporting member having a valve port for flow of fluid to relieve pressure, a loosely disposed valve member for normally closing said port and against one side of which the fluid pressure acts, a lever member supported on said supporting member and having a free end extending over said valve member, a backing plate pivotally connected to and carried by the free end of said lever member, said backing plate normally engaging with the other side of said valve member, a second lever member pivotally supported on said supporting member and normally resting on the free end portion of said first-named lever member, said second-named lever member being supported for pivotal movement in the direction of movement of said valve member and also being supported to swivel in a direction substantially lateral to the direction of movement of said valve member to disengage from said first-named lever member so that said valve member can move to open said port, spring means exerting a force acting through said lever members to hold said valve member in closed position and also acting to swivel said second-named lever member, and stop means preventing swivel movement of said second-named lever member at pressures below a predetermined pressure.

6. A pressure relief device comprising a supporting member having a valve port therein for the escape of fluid to relieve pressure, a movable valve member normally closing said port and against which the fluid pressure acts tending to move said valve member to open said port, a lever member fulcrumed on said supporting member and normally transmitting a force acting on said valve member to hold said valve member in closed position at pressures below a predetermined pressure, said lever member being fulcrumed for pivotal movement in the direction of movement of said valve member and also being supported to swivel laterally to the direction of movement of said valve member to release said valve member, said lever member having a laterally extending flange portion, a coil spring exerting a force through said lever member to normally hold said valve member in closed position and also acting to swivel said lever member, said coil spring having one end anchored and the other end attached to said laterally extending flange portion of said lever member, and stop means preventing swivelling movement of said lever member at pressures below said predetermined pressure.

7. A pressure relief device comprising, wall means having an opening therethrough to relieve pressure, a movable closure member to close said opening, a lever member to transmit a force to hold said closure member in closed position, said lever member being fulcrumed to pivot in one direction so that the closure member can move toward open position and to pivot in another direction to an inactive position to release said closure member, a tensioned spring extending longitudinally of and acting on said lever member to hold said closure member in said closed position and also acting to move said lever member to said inactive position, and means to hold said lever member against movement to said inactive position at pressures below a predetermined pressure.

8. In a fluid pressure relief device having wall means provided with a passage therethrough including a valve port and seat, a hollow valve member cooperable with said seat to close said port and having an opening in a wall thereof providing communication between the interior of said member and said passage, said hollow valve member including a pair of spaced walls, one of said walls seating on said seat, the other of said walls having a portion thereof movable in response to pressure in said hollow valve member and movable relative to said one wall so that on initial movement of the other wall said one wall will remain on said seat, said walls each having a larger surface area than the area of said port so that the fluid force acting on each of the opposed wall surfaces of said walls is greater than the fluid force acting against the opposite side of said one wall when said valve member is seated, and releasable means acting to hold said valve member seated with increasing force upon movement of said other wall in response to increasing pressure in said hollow member, said last-named means being releasable upon predetermined movement of said movable portion.

9. In a fluid pressure relief device having wall means provided with a fluid passage including a valve port and seat, a hollow valve member for said passage and movable in response to fluid pressure acting thereagainst, said valve member including a pair of relatively spaced walls of substantially equal surface area, one of said walls normally engaging said seat and having an aperture therethrough to communicatively connect the interior of said hollow valve member and said passage when said valve member is seated, said walls each having a larger surface area than said port so that the fluid force acting against each of the opposed surfaces of said walls will be greater than the fluid force acting against the opposite side of said one wall when seated, said other wall being movable relative to and away from said one wall at a predetermined pressure, and spring-urged releasable means exerting a component of force acting on said movable wall to hold said valve member seated, said releasable means being so constructed and arranged relative to said valve member that said component of force increases upon initial movement of said movable wall due to increasing fluid pressure acting thereon and such that said increase of the fluid pressure acting to move said valve member from said seat is opposed with increasing force, said valve member being movable away from said seat when the fluid force acting against the opposed wall surfaces of said spaced walls exceeds the sum of the forces exerted by said holding means and the pressure acting on the said opposite side of said one wall.

10. In a pressure relief device having wall means provided with a fluid flow passage including a port and seat, a hollow valve member cooperable with said seat to close said port and having an aperture communicatively connecting the interior thereof and said passage when said valve member is seated, said valve member including a pair of relatively spaced walls, one of said walls seating on said seat, the other of said walls being movable relative to said one wall and having a larger inner surface area than the area of said port so that the fluid force on said other wall will be greater than the fluid force acting against said one wall when said one wall is seated, and means holding said valve member seated with increasing force upon movement of said other wall under the fluid force, said last-named means being operable to release said valve member upon a predetermined fluid force.

11. A pressure relief device comprising a casing having a valve port, a hollow pan-shaped diaphragm member having a pair of relatively spaced opposite wall means of substantially equal surface area and each area being larger than the area of said port, one of said wall means being flexible, said pan-shaped diaphragm member having an opening communicating with said port whereby fluid pressure acts against said one wall means within said diaphragm member, a valve face member carried by the other of said wall means externally of said pan-shaped diaphragm member, said face member normally closing said port and when in closed position having an effective area less than the area of each of said wall means so that the fluid pressure will exert a greater force on said one wall means than on said face member, and releasable means acting on said diaphragm member to hold said face member in closed position, said releasable means exerting an increasing force on said diaphragm member upon movement thereof under increasing fluid pressure and releasable on predetermined flexing of said one wall means in one direction.

12. In a relief valve of the character described, a casing having a passageway therethrough including a valve port, a closure member cooperable with said port, releasable means having an increasing component of force upon movement thereof in one direction, said component of force acting to oppose movement of said closure member to open said port, said means being operable upon being released to allow said closure member to open said port, pressure responsive means communicating with said passageway, said responsive means being operable to urge said closure member toward closed position and to urge said releasable means in said one direction upon increase in pressure below a predetermined pressure and being operable upon said predetermined pressure in said passageway to move said releasable means to release said closure member.

13. A relief valve comprising a casing having a passageway therethrough, a seat member in said passageway, a plate member cooperable with said seat member and having an aperture therethrough registering with said passageway, said plate member extending laterally outward of and surrounding said seat member, a flexible diaphragm member overlying said passageway and having its marginal edge extending beyond said seat member and sealed to said plate member, an annular flange extending upward from the marginal edge of said plate member and cooperating with said casing to position said plate member laterally relative to said passageway, and releasable means exerting a predetermined resistance to movement of said diaphragm member by pressure in said passageway, said diaphragm member and said plate member cooperating to define a chamber so that pressure in said passageway less than the pressure required to overcome said releasable means will act to hold said plate member on said seat member.

14. A pressure relief device comprising a casing having a valve port, a hollow pan-shaped diaphragm member having a pair of relatively spaced opposite wall means of substantially equal surface area and each area being greater than the area of said port, one of said wall means being flexible, said pan-shaped diaphragm member overlying said port with a wall means thereof being adjacent said port, a valve face member carried by said adjacent wall means externally of said diaphragm member and normally closing said port, said adjacent wall means and said face member having aligned apertures forming means of communication between said diaphragm member and said port, and releasable means operable to engage the wall means spaced from said adjacent wall means and to oppose movement thereof with increasing force upon increase of pressure within said port below a predetermined pressure, said adjacent wall means being operable to urge said face member with increasing force toward port closed position with increasing pressure within said port below said predetermined pressure, said releasable means being operable upon said predetermined pressure to release said diaphragm member and thereby open said port to flow of fluid.

15. In a pressure relief device having a port with a valve seat, a valve structure comprising a pair of flexible diaphragms cooperating to provide a hollow member for seating on said seat, said diaphragms extending beyond the peripheral portion of said seat, one of said diaphragms having an aperture providing communication between said port and said hollow member so that fluid pressure within said port will be transmitted to the interior of said hollow member to act internally on both of said diaphragms, and releasable means movable upon expansion of said hollow member, said releasable means being so constructed and arranged to have an increasing component of force upon movement thereof due to expansion of said hollow member to hold said hollow member against said seat at pressures below a predetermined pressure.

ADOLF VON WANGENHEIM.